United States Patent Office 3,668,010
Patented June 6, 1972

3,668,010
FUEL CELLS AND FUEL CELL BATTERIES OPERATING AT HIGH TEMPERATURE AND PROCESS OF MANUFACTURE THEREOF
Jacques Fally, Orsay, Yvon Lazennec, Saint-Michel-sur-Orge, and Claude Lasne, Antony, France, assignors to Compagnie Generale d'Electricite, Paris, France
Filed May 15, 1970, Ser. No. 37,641
Claims priority, application France, May 16, 1969, 6915968; Oct. 1, 1969, 6935500
Int. Cl. H01m 27/16
U.S. Cl. 136—86 F                                      19 Claims

ABSTRACT OF THE DISCLOSURE

A solid electrolyte fuel cell operating at a high temperature, comprising several elements electrically connected in series. These elements are supported by one electrolyte tube, and one end of the external electrode of an element protrudes slightly above the internal electrode of the following element. This enables simplified assembly and a reduction in the weight and the cost price of the fuel cell.

BACKGROUND OF THE INVENTION

The present invention relates to a solid electrolyte fuel cell operating at high temperature, of the type comprising a plurality of elements each formed by a portion of the electrolyte tube, respectively supporting on their internal and external faces as internal electrode and an external electrode, formed by conductive coatings of suitable nature and texture, the internal electrode of one element being electrically connected to the external electrode of the following element, so as to ensure a series connection of the said elements.

From French Pat. 1,585,403, filed Apr. 19, 1968, in the name of Compagnie Generale d'Electricite and having as its title "Solid Electrolyte Fuel Cell," it is known to construct such cells by the electrolyte tube portions being assembled end to end without covering and by disposing between the ends of the said tube portions, metal parts which are designed to ensure firstly the tightness between the different elements and secondly an electric contact between the external electrode of one element and the internal electrode of the following element, means being additionally provided for avoiding any electrical contact between two electrodes of the same sign.

The assembly as thus obtained is then disposed in a casing, consisting for example of quartz, fitted with means by which it is supported and centered. In addition, hollow metal driver members are disposed on either side of the assembly and are adapted to tighten the elements one against the other. These driver members also serve to ensure the picking up of current and to supply with a first gas the space which is defined inside the tubular elements, while a second gas circulates inside the space defined by the casing, the tubular elements and the driver members.

These driver members can act on the ends of the assembly by means of springs disposed at the ends of the casing and inside the latter, so as to be applied to the ends of the casing and to push the said hollow driver members against the ends of the assembly, as described for example in application for first Certificate of Addition No: 6901866 of the Jan. 30, 1969, to the aforesaid French patent.

In the cells as described above, the presence of the casing and the devices provided for maintaining the pressure at the ends of the element assembly has the disadvantage of considerably increasing the weight of the cell and of also increasing the cost of production. Thus, the weight and the cost of the casing represent about 50 to 60% of the weight and cost of the active part of the cell.

SUMMARY OF THE INVENTION

The present invention particularly permits these disadvantages to be overcome.

It has for its object a solid electrolyte fuel cell operating at high temperature, of the type comprising a plurality of elements each formed by a portion of electrolyte tube respectively supporting on its internal and external faces an internal electrode and an external electrode formed by conductive coatings of suitable nature and texture, the internal electrode of one element being electrically connected to the external electrode of the following element so as to ensure a series connection of the said elements, the said cell being characterized in that the said tube portions are formed by annular regions of a single tube, the external electrodes carried by the external face of this tube leaving between them free zones, as well as the internal electrodes carried by the internal face of this tube, the zones left free on the external face not covering those left free on the internal face, one end of the external electrode of one element extending slightly beyond one end of the internal electrode of the following element and thus establishing a zone called an overlapping zone, means being provided at the level of the said overlapping zone to ensure the electrical connection between the external electrode of one element and the internal electrode of the following element.

According to the invention, the said means can consist in providing the electrolyte tube with holes or slots, which are then filled with a conductive material. It is also possible, when the tube is being manufactured, to provide porous parts in the tube at the level of these overlapping zones and then to deposit a conductive material by impregnation in these porous parts. It is also possible for the electrolyte tube to be charged with a material making it capable of electronic conduction at the level of these overlapping zones.

The invention also has for its object a fuel cell battery comprising a plurality of cells as described above.

According to one feature of the invention, the ends of the electrolyte tube have on their external face metal-coated zones which form the terminals of the cell and, at one end, an electrode of the element which is closest to the said end is electrically connected to one of the said zones, while at the other end, the electrode of opposite polarity of the element closest to this other end is connected to the other metal-coated zone.

DESCRIPTION OF THE PREFERRED EMBODIMENT

Figure 1:
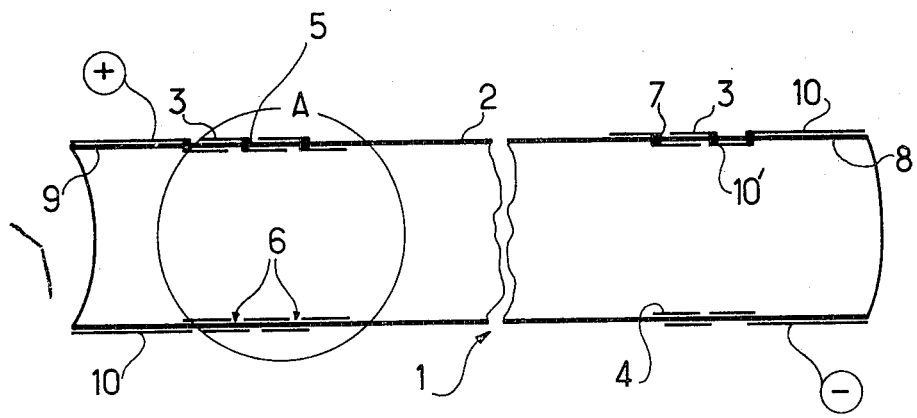
FIG. 1 represents very diagrammatically and in section one embodiment of a cell according to the invention.

In the drawings, the reference 1 represents a fuel cell according to the invention.

It is basically constituted by a tube 2 formed by the solid electrolyte, supporting annular electrodes 4 on its internal face and annular electrodes 3 on its external face, these being formed by conductive coatings.

The external electrodes 3 leave between them free zones 5 and the internal electrodes 4 also leave between them free zones 6.

One element is formed by an external electrode 3, the portion of the electrolyte tube 2 supporting the said external electrode 3 and the internal electrode 4 supported by the said portion of the tube 2.

Figure 2:
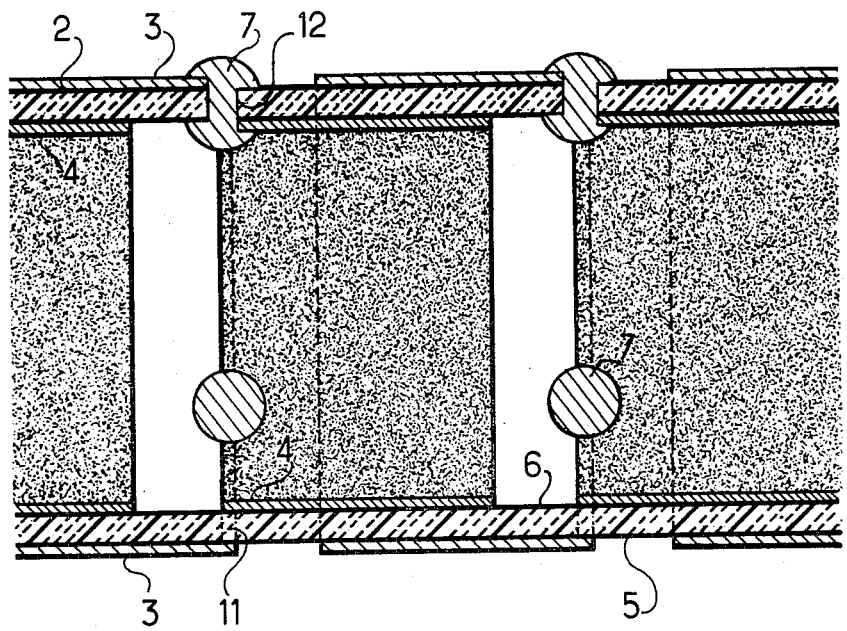
FIG. 2 is an enlarged view of the encircled portion A of FIG. 1.

As can be seen by reference to FIG. 2, firstly the free zones 5 do not cover the free zones 6, and secondly one end of an external electrode 3 is extended slightly beyond an end of the internal electrode 4 of the following element, thus establishing an overlap zone 11. In the embodiment illustrated, which has only been given as an example, the electrolyte tube 2 is provided at the level of these overlap zones 11 with orifies 12 which contain a conductive material 7 ensuring the electrical connection between the external electrode of one element and the internal electrode of the following element.

At the location of the same overlap zone 11, it is possible to have, for example, 3 or 4 holes 12 around the circumference of the tube 2.

The ends 8 and 9 of the electrolyte tube 2 have metal-coated zone on their external face, these zones forming the cell terminals.

Figure 3:
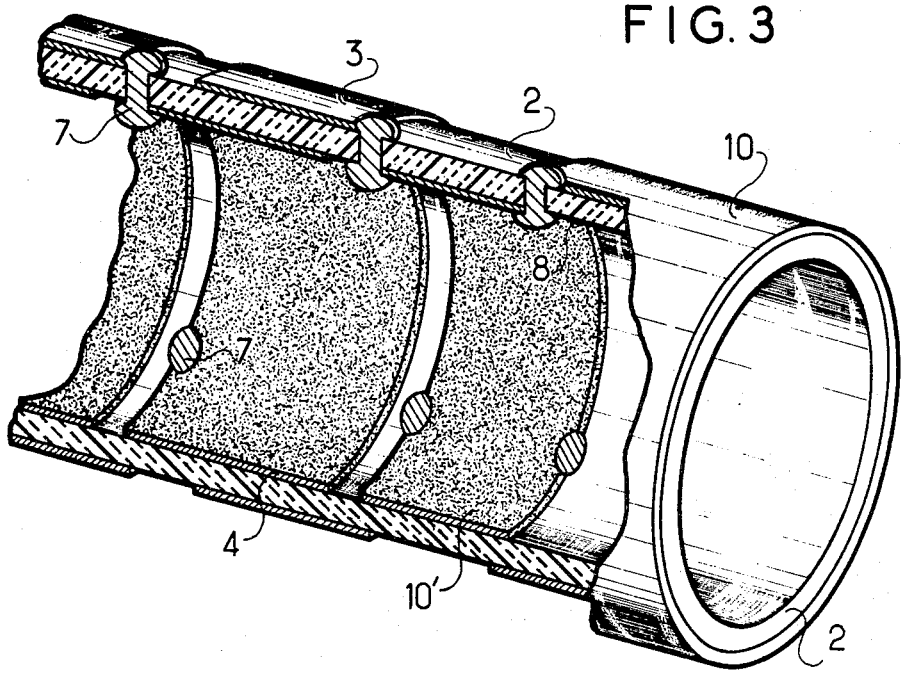
FIG. 3 is an enlarged perspective view, with one end partially broken away, of one embodiment of a cell according to the invention.

As can be seen in FIG. 3, the external electrode 3 of the element which is closest to the end of the tube 2 is electrically connected to an internal metal-coated layer 10', which is spaced from the internal electrode 4. The layer 10' is then electrically connected to the metal-coated zone 10. The electrical connections between firstly the electrode 3 and the metal-coated layer 10', which may moreover be of the same nature as the electrode 4, and secondly the layer 10' and the zone 10, are ensured in the same manner as those existing between the external electrodes 3 and the internal electrodes 4. It would also be possible to visualize extending the zone 10 up to the electrode 3, which would obviate the layer 10'.

Figure 4:
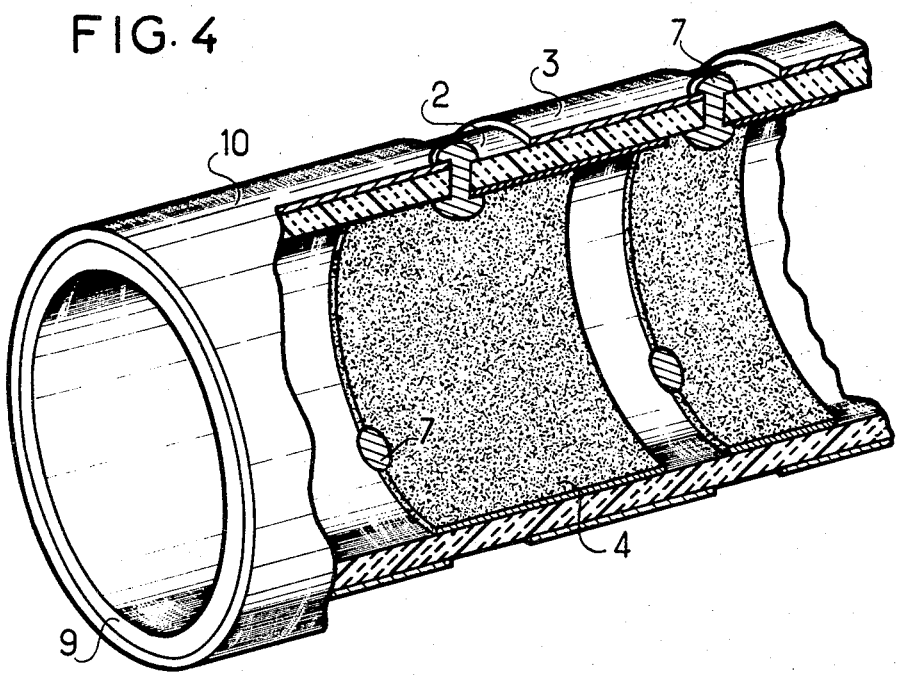
FIG. 4 is an enlarged perspective view, with partial breaking away of the other end of a cell according to the invention.

In FIG. 4, it can be seen that the internal electrode 4 of the element closest to the end 9 of the tube 2 is connected to a metal-coated zone 10, which is spaced from the external electrode 3.

The electrical connection between the electrode 4 and the metal-coated zone 10 is ensured in the same way as those existing between the external electrodes 3 and the internal electrodes 4.

By way of illustration and without any limiting character, the electrolyte tube 2 can have a length of 30 cm. and external diameter of 12 mm. and a thickness of about 200 microns. It can be formed of zirconium dioxide stabilized with yttrium oxide. It can be produced by electrophoresis, as described in the application for first Certificate of Addition No. 183,128 of the Dec. 31, 1968 to French patent application 181,343, filed on Dec. 27, 1968 by the Compagnie Generale d'Electricite and having as its title "Process for the Manufacture of Thin Parts in a Material of the Ceramic Type." The holes or slots with which the electrolyte tube is formed can also be made at the time of manufacture, as described in the application for second Certificate of Addition No. 6,906,332 of the Mar. 6, 1969 to the aforementioned application 181,343 of the Dec. 27, 1968.

It would also be possible by electrophorsis to produce a tube without a hold and to puncture it at the time of presintering and before the sintering.

By way of example, the deposition by electrophoresis, in the case of stabilized zirconium dioxide, is effected in the following manner.

In a first step, the grains of the sinterable material are treated in a suitable liquid so as to be electrically charged. As solvent, it is thus possible to use nitromethane to which small quantities of benzoic acid are added. It is also possible to employ a mixture of acetone and ethyl alcohol containing small quantities of nitrocellulose.

The grains as thus charged and in suspension are deposited on a mandrel or support immersed into this suspension, the said mandrel or support being given a polarity opposite to that of the said grains, by establishing a potential difference between this mandrel or support, and for example, the container holding the suspension.

When the deposition is completed, the mandrel thus covered with its coating is then cut by any suitable abrasive tool (wire, paper, etc.) into section with a length of 5 mm., which are then subjected to the operation of being brought under isostatic pressure, that is to say, under a uniform pressure, of the order of several tons per square centimeter.

As a non-elastic solid protective material for protecting the surface of the coating during this operation, it is preferred to use a sheet of ethylene glycol polyterephthalate, such as the product marketed under the name "Mylar," which is coated with aluminum on its face directed towards the coated support, or even a thin sheet of aluminum, which has the advantage of a lower tendency to sticking at the moment of its removal than a sheet of "Mylar" which is not coated with aluminum. In the case where a thin aluminum sheet is employed as protective film, it is preferable to subject the tube, before removal of this sheet, to a preliminary heat treatment below the melting point of the aluminum, so as already to give it a certain solidity.

The zirconim dioxide tubes with a length of 5 mm. and a diameter of 5 mm. are then removed from the mold and subjected to the sintering heat treatment, for example, a pre-sintering under oxygen at 1500° C. and a definitive sintering under vacuum or under intert gas at 2000° C. or 2100° C., followed by a reoxidation at 1500° C. in an air atmosphere.

In the case in which the combustible gases, for example, hydrocarbons, circulate inside the zirconium dioxide tubes, and the combustion-supporting gases, for example air, circulate externally of this tube, the internal electrodes 4 can consist of nickel, cobalt, iron, chromium, etc., and the external electrodes 3 can consist of a silver-palladium alloy or even based on electronically conductive oxides, for example, indium oxide doped with gallium oxide or antimony or tin. These electrodes can be doped by any appropriate means.

The internal and external electrodes in the case of the example as described can extend over a length of about 20 cm. and leave at the ends of the tube 2 zones of about 5 cm. intended for picking up the current. The width of the electrodes can be of the order of 5 mm. Between two electrodes of like polarity, the distance can also be of the order of 1 mm.

The electrical connection between the external electrods 3 and internal electrodes 4 can be obtained by means of silver-palladium brazing.

For ensuring an excellent tightness at the location of the junctions between electrodes, the walls of the holes 12 are advantageously covered by a thin layer of glass obtained by deposition on the hole of a drop of a suspension of ground glass in an organic binder and treatment at about 1300° C. in air. A small amount of glass can also be introduced into the silver-palladium brazing, this permitting a perfect connection after treatment at about 1250–1300° C., between the brazing and the previously deposited thin glass layer adhering to the electrolyte tube. By increasing the proportion of glass in the glass and silver-palladium brazing mixture, it is also possible to dispense with the previous deposition of the thin glass layer.

A cell which has such structural features and of which the active portion is brought to the region of 1000–1100° C. is able to provide a power of about 40 watts and to deliver 40 volts in open circuit and 4 amperes in short-circuit.

It has previously been indicated that the means for ensuring the electrical connection between the external electrode of one element and the internal electrode of the following element can consist in providing, when the tube is manufactured, porous portions in the latter at the location of these overlap zones and then in depositing a conductive material by impregnation in these porous parts.

According to one embodiment of the invention, the said porous parts can be extended perpendicularly of the overlap zone over the entire periphery of the tube and in its full thickness, thus defining rings.

In order to produce the tubular portions, it is possible for the material intended to form the electrolyte to be deposited in the form of a tube and then to make on the said tube regularly spaced recesses perpendicularly of its axis and throughout its thickness.

It is also possible to use the procedure described in the application for second Certificate of Addition No. 6906332 of the Dec. 31, 1969, to the aforementioned French patent application 181,343, this consisting in providing the mandrel with grooves perpendicular to its axis and filled with an insulating material, for example, an insulating varnish, so that a deposition with the electrophoresis is avoided at the location of the said grooves, or the mandrel can even be covered with rings of insulating material.

By way of illustration, the width of the tubular portions can be about 5 mm. and the width of the space between the tubular portions can be between 0.5 and 1 mm. The material for forming the electrolyte can be zirconium dioxide stabilized, for example, with 8.5% of yttrium oxide.

After having made the said tubular portions, the spaces between them are filled with a paste which comprises more especially the material intended for forming the electrolyte, a porogenic agent and also a solvent and a binder. The porogenic agent can for example be ammonium carbonate or carbamate, which decomposes at about 50 to 60°, leaving pores; the said agent can even be graphite, which is thereafter eliminated by causing it to burn. The solvent can be water, and the binder can be carboxymethyl cellulose or even a polyvinyl alcohol.

After the paste has been placed in position, a drying is carried out so as to evaporate the solvent contained in the said paste.

The coating thus provided on the mandrel is then subjected to the aforesaid treatment, comprising particularly the operation of being brought under isostatic pressure, and after elimination of the mandrel, the pre-sintering and sintering operations. On completing these operations, an electrolyte tube is then obtained which comprises the porous rings in regularly spaced relation.

These porous rings are then impregnated by means of a solution of metal salts; after impregnation, a heat treatment is carried out so as to obtain a deposition of the metal in the pores. These operations of impregnation and thermal decomposition are possibly repeated until a good tightness and a good electronic conduction are obtained at the location of the said porous rings.

By way of illustration, it is possible to use a solution of metal salts obtained by the action on a silver-palladium alloy, for example, with 20% of palladium by nitric acid; this solution is brought to a suitable concentration by heating and evaporation.

The pH of this solution is brought to the region of 4, for example, by adding ammonia. Distilled water can possibly be added so as to bring the solution to the limit of saturation. The porous rings are then impregnated with this solution and thereafter a heat treatment is carried out at about 850° C. in air, so as to decompose the solution and to obtain the silver-palladium deposits.

The deposition of the electrodes is then undertaken. Generally, in order to obtain a good adhesion of the electrodes on the electrolyte tube, the tube is surface-treated before the deposit of the electrodes so that the surfaces to which the electrodes are to become attached are made more or less rough. It is possible to carry out a surface treatment with concentrated sulphuric acid at a temperature of about 300° C., followed by a washing with ultrasonic waves and a roasting at about 1400 to 1500° C. to eliminate the traces of salt.

However, in the case where the electrolyte tube is provided with porous rings, the process indicated above cannot be used, because it involves the danger of causing more or less pronounced destruction of the said porous rings.

According to the present invention, it is proposed that the parts of the electrolyte tube which have to support the electrodes should be provided with a thin porous coating, forming an integral part of the tube and formed by the same material.

This thin porous coating can be produced in the following manner:

(a) a paste of the same nature as that used to form the porous rings can be deposited at suitable locations on the pre-sintered tube, this paste being deposited in the form of a thin layer.

For depositing the paste on the internal wall of the tube, it is for example, possible to use the arrangement described in French patent application No. 6919003, filed on June 9, 1969, in the name of the applicants, and having as its title "Arrangement for Depositing a Coating on the Internal Wall of a Tube."

The deposit on the external wall can be effected by means of a brush.

However, in the pre-sintered state, the tubes are fragile and the handling thereof can cause damage.

(b) In order to provide the porous layers intended for supporting the internal electrodes, the aforesaid paste is deposited at suitable locations on the cylindrical mandrel prior to the formation of the tube by electrophoresis, it being possible to effect this deposition, for example, by means of a brush or pistol, using masks.

The formation of the tube by electrophoresis and the formation of the porous rings is then effected as indicated above.

In order to produce the porous layers intended for supporting the external electrodes, the aforesaid paste is deposited at suitable locations on the tube before the operation of being brought under isostatic pressure, this deposit being effected, for example, by means of a brush.

It is important that the binder participating in the formation of the paste is insoluble in the solvents used for the deposition by electrophoresis, otherwise the internal porous layers would be dissolved. In the case where the solvents used for the depositions by electrophoresis are formed by chloroform and nitromethane, it is possible to use water as solvent and carboxymethyl cellulose or a polyvinyl alcohol as binder in the paste. The deposition of the electrodes on the porous layers as thus formed can be effected, for example, in accordance with the procedure described in French patent application No. 6901436, filed on Jan. 24, 1969 in the name of the applicants and having as its title "Process for Depositing Adherent Layers of a Metal on a Substratum." It is also possible for the metal constituting the electrode to be directly deposited without previously carrying out the deposition of a bonding metal.

The invention is also concerned with the construction of fuel cell batteries from fuel cells as described above. To this end, the cells can be disposed parallel to one another.

Figure 5:
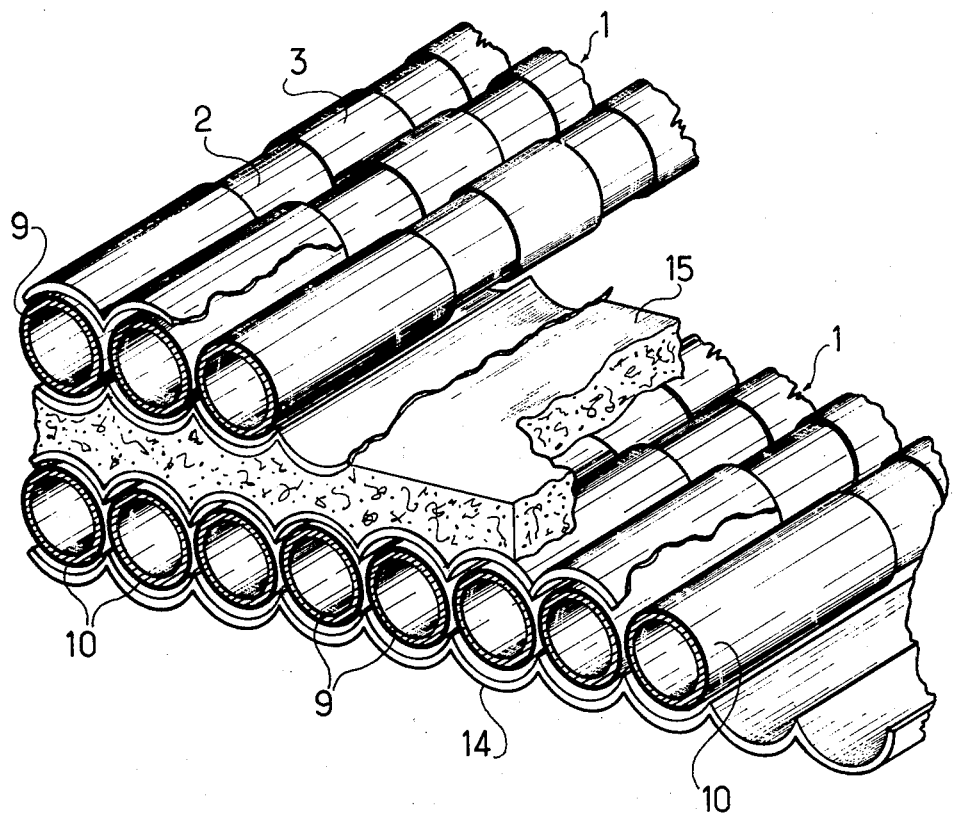
FIG. 5 is a perspective view, partially broken away, of one embodiment of a part of a cell battery according to the invention.

FIG. 5 is a perspective view, partly broken away, showing one embodiment of a part of a cell battery according to the invention.

In the embodiment illustrated, the different cells 1 are first of all assembled so as to form rows. The electrical connections between the cells forming each row are assembled by means of metal strips 14 having substantially cylindrical corrugations receiving the said cells. The strips are applied to the cells at the location of the metal-coated zones 10 and thus form the terminals of each row of cells. In a single row, all the cells are thus in this way connected in parallel. Several rows are then stacked in a suitable container, and a material 15 for ensuring a good heat insulation is disposed, for example, in strip form, between two rows, at the location of the metal strips 14. The terminals of the different rows of cells are then electrically connected in appropriate manner so as to provide connections in series and/or in parallel.

In the same way, the cells could be assembled vertically.

The different electrolyte tubes are connected in fluid-tight manner to means for the supply and discharge of gases.

In place of the metal strips, it would be possible to use any other suitable means for enabling the different cells to be electrically connected to one another.

It would thus be possible to use a system comprising clips, etc.

It is obvious that the invention is not in any way limited to the embodiments which have been described and illustrated, these only having been given by way of example. In particular, and without departing from the scope of the invention, it is possible to incorporate modifications in detail, to change certain arrangements or replace certain means by equivalent means.

What is claimed is:

1. In a solid electrolyte fuel cell operating at high temperature, of the type comprising a plurality of elements each formed by a portion of an electrolyte tube respectively supporting on its internal and external faces an internal electrode and an external electrode formed by conductive coatings of suitable nature and texture, the internal electrode of one element being electrically connected to the external electrode of the next adjacent element so as to ensure a series connection of said elements; the improvement wherein the said tube portions are formed by annular regions of a single tube, the external electrodes carried by the external face of said tube being spaced from each other so as to define free zones between them, the internal electrodes carried by the internal face of said tube being spaced from each other so as to define free zones between them, said free zones on the external face not covering said free zones on the internal face, one end of the external electrode of each element being extended slightly beyond one end of the internal electrode of the next adjacent element to establish an overlap zone between said electrodes, an aperture extending through said tube at the location of said overlap zone, and electrically conductive material disposed in said aperture and in contact with the external electrode of one element and the internal electrode of the next adjacent element to electrically connect said electrodes.

2. A cell according to claim 1, wherein a porous part is disposed in the aperture of said tube and the conductive material is deposited in said porous part.

3. A cell according to claim 2, wherein said porous part is extended perpendicularly of the overlap zone, over the entire periphery of the tube and throughout its thickness, thus defining a ring.

4. A cell according to claim 2, wherein the portion of the tube supporting the electrodes are provided with thin porous coatings, forming an integral part with the tube and formed of the same material.

5. A cell according to claim 1, wherein the external face of the ends of the electrolyte tube comprises metal-coated zones forming the terminals of the cell, an electrode of the terminal element at one end of the said tube being connected to one of the said metal-coated zones, while the electrode of opposite polarity of the terminal element is connected at the other end to the other metal-coated zone.

6. A cell according to claim 1, wherein a combustible gas circulates inside said tube and a combustion-supporting gas circulates externally thereof.

7. A cell according to claim 6, wherein the electrodes carried by the internal face of the tube comprise one or more of the following materials: iron, nickel, cobalt, chromium.

8. A cell according to claim 6, wherein the electrodes carried by the external face of the said tube comprise one or more of the following materials: silver-palladium alloy, electronically conductive oxides, for example indium oxide doped with gallium oxide, or antimony or tin.

9. A cell according to claim 8, characterized in that the conductive material connecting the external electrodes and the internal electrodes is a silver-palladium alloy.

10. A fuel cell battery comprising a plurality of electrodes according to claim 1, wherein the cells are disposed in rows parallel to one another, the terminals of like polarity of each of the cells being connected electrically by means of at least one metal strip comprising substantially semi-cylindrical corrugations designed to receive the ends of the cells.

11. A cell battery according to claim 10, wherein the ends of the cells forming a single row are gripped between two metal strips comprising corrugations.

12. A cell battery according to claim 11, wherein a heat-insulating material is disposed between the metal strips of two successive rows.

13. A process for manufacturing a solid electrolyte fuel cell, comprising the steps of coating a cylindrical mandrel by electrophoresis with material intended to form an electrolyte so as to form regularly spaced tubular portions on said mandrel, filing the spaces between said portions with additional amounts of said material in which there has been incorporated a porogenic agent, drying the coating thus formed, subjecting the coating to isostatic pressure, removing the mandrel so as to provide an electrolyte tube with spaced porous rings, subjecting the coating to pre-sintering and sintering operations, impregnating the porous rings with solutions of metal salts which are then thermally decomposed until a good tightness and a good electronic conduction are obtained at the location of the porous rings by the deposited metal, and depositing conductive coatings in longitudinally spaced relation on the inner and outer surfaces of the electrolyte tube to form external electrodes carried by the outer surface of the tube and spaced from each other so as to define free zones between them and internal electrodes carried by the inner surface of the tube and spaced from each other so as to define free zones between them, said conductive coatings being deposited such that the free zones on the outer surface do not cover the free zones on the inner surface and such that one end of each external electrode is extended slightly beyond one end of the next adjacent internal electrode to establish overlap zones at the location of the porous rings, whereby each external electrode and the next adjacent internal electrode are electrically connected by the metal deposited in the porous rings.

14. A process according to claim 13, wherein the deposition is effected in the form of a tube, and then recesses are formed on the said tube perpendicular to its axis and throughout its thickness so as to form regularly spaced tubular portions.

15. A process according to claim 13, wherein the surface of the cylindrical mandrel is coated in an appropriate manner with an electrically insulating material, so as finally to obtain regularly spaced tubular portions after the deposition by electrophoresis.

16. A process according to claim 13, wherein for the impregnation, there is used a solution of metal salts obtained by the action of nitric acid on a silver/palladium alloy, the solution obtained being then suitably concentrated and its pH brought to the region of 4, the thermal decomposition then being carried out at about 850° C. in air.

17. A process according to claim 13, wherein, on the pre-sintered tube and before the sintering operation, the parts of the tube intended to support the electrodes have deposited thereon a thin coating formed by the material which is to produce the electrolyte and in which a porogenic agent is incorporated.

18. A process according to claim 13, wherein the cylindrical mandrel, prior to the electrophoresis operation, has deposited thereon at suitable locations a thin coating which is formed by the material which is to produce the electrolyte and in which a porogenic agent has been incorporated, the said coating being adapted to form a connecting layer for the internal electrodes.

19. A process according to claim 13, wherein, before the operation of being brought under isostatic pressure, the parts of the tube intended to support the external electrodes have deposited thereon a thin coating which is formed by the material which is to produce the electrolyte and in which a porogenic agent has been incorporated.

References Cited

UNITED STATES PATENTS

| | | | |
|---|---|---|---|
| 3,311,504 | 3/1967 | Johnson | 136—86 R |
| 3,402,230 | 9/1968 | White | 136—86 R |
| 3,458,357 | 7/1969 | Truitt | 136—86 R |
| 3,507,705 | 4/1970 | Tannenberger et al. | 136—86 R |
| 3,525,646 | 8/1970 | Tannenberger et al. | 136—86 F |

WINSTON A. DOUGLAS, Primary Examiner

H. A. FEELEY, Assistant Examiner